Jan. 13, 1953 J. SCHNEIDER 2,625,058
SAW SET
Filed Aug. 27, 1951 2 SHEETS—SHEET 1
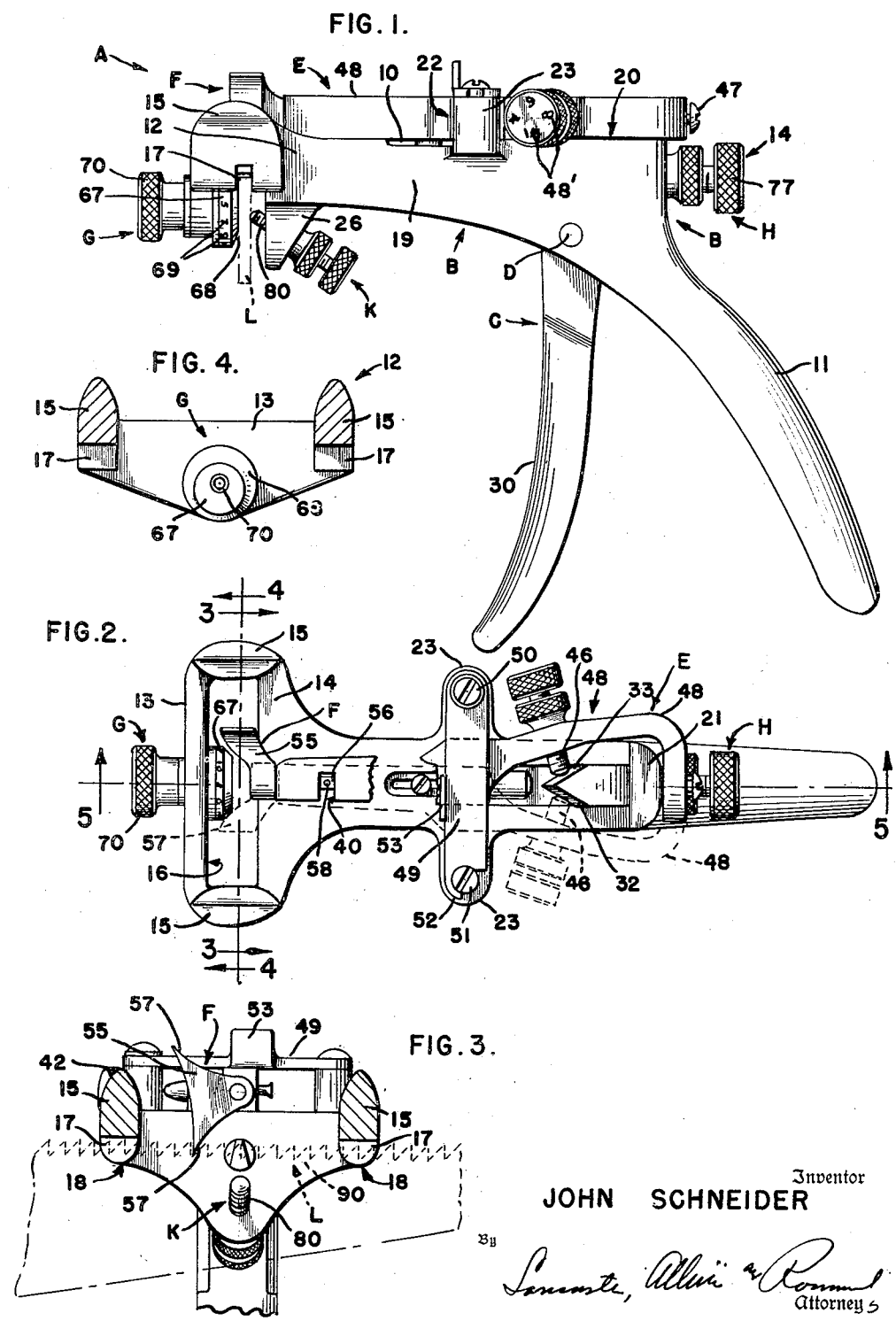
Inventor
JOHN SCHNEIDER
By Lancaster, Allwine & Rommel
Attorneys Jan. 13, 1953    J. SCHNEIDER    2,625,058
SAW SET Filed Aug. 27, 1951    2 SHEETS—SHEET 2

Inventor
JOHN SCHNEIDER
By
Attorneys

Patented Jan. 13, 1953

2,625,058

UNITED STATES PATENT OFFICE 2,625,058

SAW SET

John Schneider, Ann Arbor, Mich.

Application August 27, 1951, Serial No. 243,818

13 Claims. (Cl. 76—69)

This invention relates to saw sets.

An important object of the invention is to provide a manually-operated hand tool for the so-called setting of saw teeth by means of a conventional anvil and a reciprocating plunger, wherein the tool comprises but few parts and none of them complicated nor apt to get out of order.

Another important object is to provide a saw set having quick, positive and accurate means for adjusting the movement for setting the teeth of hand or band saws of various types, such as those having teeth from four to ten points per inch.

Still another important object is to provide a saw set having readily-manipulated means for reversing the feed.

A further important object is to provide a reversible pawl for engaging the saw teeth which pawl is retained against accidental reversing and movement of the pawl provided by a special two-faced cam member in conjunction with a cam follower, which with its support, may be swung so that the follower may contact either of the cam faces of the cam member.

In addition, another important object is to provide a saw set in which the necessary adjustments of parts may be made by an operator inexperienced in saw setting and the saw teeth then set without previous experience.

Other objects and advantages of the invention will be apparent during the course of the following detailed description of the invention, taken in connection with the accompanying drawings, forming parts of this disclosure, and in which drawings:

Fig. 1 is one side elevation of the new saw set.

Fig. 2 is a top plan thereof, with the positions of certain parts shown in full and dotted lines.

Figs. 3 and 4 are transverse sections thereof, substantially on their respective lines of Fig. 2.

In the drawings, wherein for the purpose of illustration is shown a preferred embodiment of the invention and wherein similar reference characters designate corresponding parts throughout the several views, the letter A designates the new saw set as a whole, and L a saw.

Figure 5:
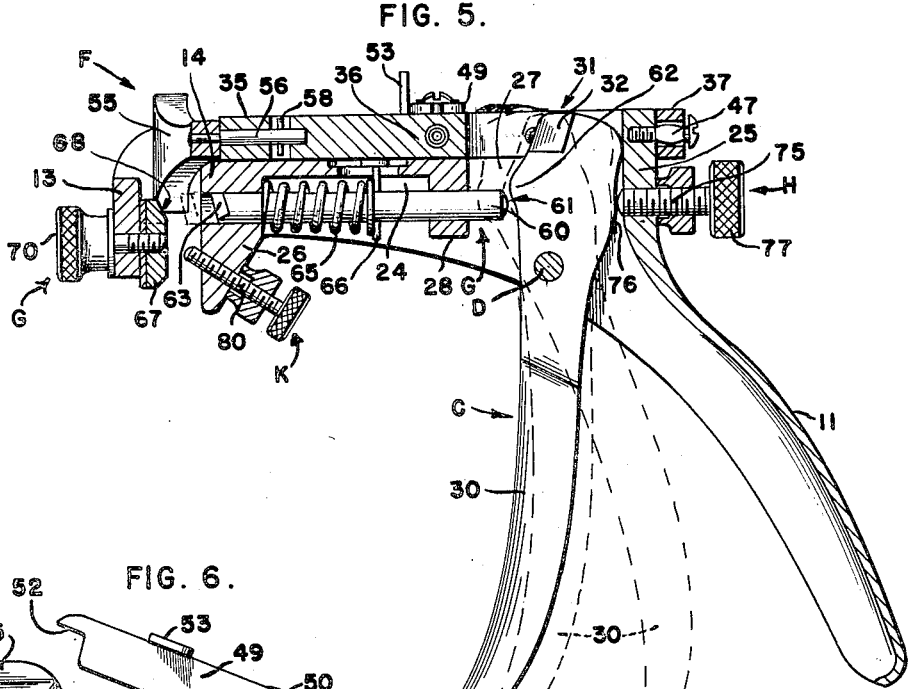
Fig. 5 is a vertical longitudinal section of the new saw set.

The new saw set A comprises a combined support and fixed handle B, combined cam and movable handle C, pivot means D therefor, new manually and mechanically movable means E to operate a special pawl F, saw setting means G, and means H to limit movement of the handle portion 30, to synchronize movements of the means E and G, and adjustment means K to cause the teeth carrying portion of the saw L to contact the anvil of the new saw set A.

It is preferred that the combined support and fixed handle B be an integral casting comprising a substantially straight elongated support portion 10 and elongated handle portion 11, with their longitudinal axes forming an obtuse angle. Looking down upon the support portion 10, as in Fig. 2, the forward or saw-engaging part 12 comprises two transversely-extending substantially parallel narrow plates 13 and 14, joined together at their ends by longitudinally-extending, substantially parallel wider but shorter plates 15, whereby an opening 16 is provided, defined by these plates. As in Figs. 1 and 3, the plates 15 each have an aligning slot 17, extending upwardly from the lower faces 18 of the plates 15 to slidably receive the toothed edge portion of a saw, which edge portion also extends into the opening 16, as in Figs. 1 and 3.

Rearwardly of the part 12, the portion 10 may be provided with a hollow wall 19, gradually narrowing and then, at its narrowest part, extending rearwardly at a substantially uniform width to provide an upper face 20, with a bearing lug 21, extending therefrom at the rearward end of the wall 19. Intermediate the part 12 and lug 21, is a transversely-extending auxiliary support 22 with its upper face flush with the face 20, and there are a pair of lugs 23 extending upwardly from the outer ends of the support 22, having substantially flat upper faces.

The hollow wall 19 provides a cavity 24 extending longitudinally of the wall, being closed at its forward end by the plate 14 and closed at its rearward end by a wall portion 25. It will be noted, as in Figs. 1 and 5, that the plate 14 projects below the wall 19 to provide a bearing 26 for a purpose later described, and there is a longitudinally-extending slot 27 in the upper face 20, extending to the cavity 24 and being in the narrowest part of the wall 19. Also, there may be provided a bearing 28 for the rod or bar plunger 60 of the means G to be subsequently described.

As for the elongated handle portion 11 it comprises a downwardly and rearwardly bowed body projecting from the rear end part of the wall 19, and adapted to fit into the palm of the hand of an operator.

The combined cam and movable handle C, is best shown in Fig. 5 and preferably comprises a handle portion 30 and cam body 31 integral therewith.

This handle portion 30 comprises a downwardly and forwardly bowed body, disposed within a hand-gripping distance from the handle portion 11 and adapted to fit against the fingers of the hand of the operator.

Figure 6:
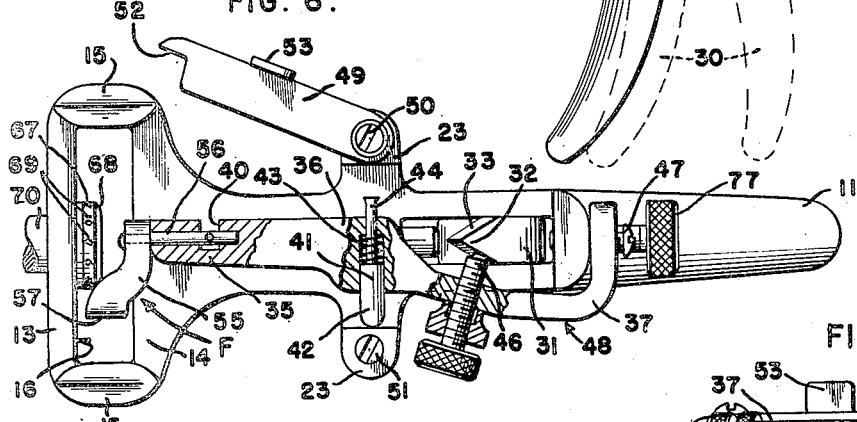
Fig. 6 is a top plan of the new saw set, differing from Fig. 2, in that parts are in positions differing from their positions in Fig. 2 and some parts are broken away in order to reveal structure beneath.
Figure 8:
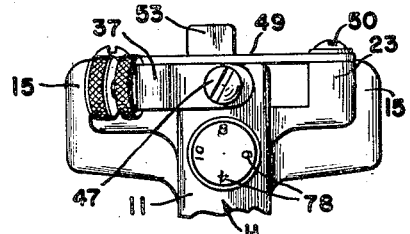
Fig. 8 is a fragmentary rear elevation of the new saw set.
Figure 7:
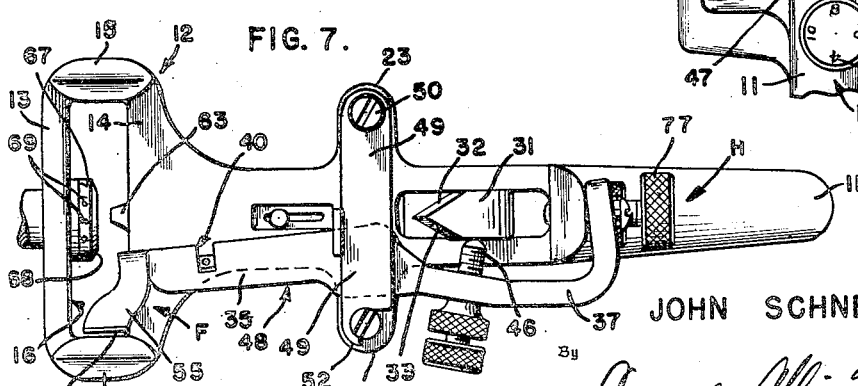
Fig. 7 is also a top plan and differing from Figs. 2 and 6 in the positions of certain of the parts.

At the upper end of the handle body just described, projects the cam body 31, shown in Figs. 2, 6 and 7, and it has a pair of cam faces 32 and 33 converging to a forwardly-extending edge and diverging rearwardly to a pair of substantially parallel flat faces.

The combined cam and movable handle C is operatively connected with the combined support and fixed handle B, as by the pivot means D, which may comprise a pivot pin extending through suitable openings in the wall 19 adjacent its rearward end and through a suitable opening in the upper part of the handle portion 30.

Movably supported by the combined support and fixed handle B, is manually and mechanically movable means E to actuate the special pawl F. The means E may be manually partly raised up at its free end, and swung to either of two positions with respect to the longitudinal axis of the support portion 10, as shown in full and dotted lines in Fig. 2, and also mechanically oscillated to swing to the two positions shown in Figs. 6 and 7 or to the two possible like positions as will be appreciated from the full line position as in Fig. 2.

The means E includes a member having a pawl-carrying end portion 35, a spring-loaded plunger-carrying intermediate portion 36, rigid therewith, and a cam follower-carrying end portion 37 rigid with the portion 36.

The portion 35 has a pair of like smooth faces 38, slidable over the upper smooth face of the plate 14, is preferably straight and provided at its outer end with a longitudinally-extending bore 39 (as in Fig. 6) extending to a groove cut into the portion 35 and extending from one face to the opposite face for a purpose to be detailed.

As best shown in Fig. 6, the spring-loaded plunger-carrying intermediate portion 36 is preferably somewhat enlarged in width over the portion 35 and contains a transversely-extending plunger-and-spring-receiving opening or bore 41 from one side face of the portion 36, and a plunger tail-receiving bore, extending from the axial center of the inner end of the opening 41 to opposite side face. The opening 41 slidably receives a plunger 42, preferably having a rounded outer face, and the plunger normally projects partly out of the opening 41 when the expansion helical spring 43, within the opening 41 and back of the plunger has fully expanded. One end of the spring bears against the inner end of the plunger and the other against the wall at the inner end of the opening 41. The tail 44 of the plunger is slidable in the tail-receiving bore.

As may be seen in Figs. 2, 6 and 7, the cam follower-carrying end portion 37 is preferably curved or bowed to provide a recess 45 to accommodate the cam body 31 and the bearing lug 21, as well as the free end portion of a cam follower 46, which follower preferably comprises the screw-threaded shank of a set screw, with the tip of the shank adapted to contact a selected cam surface 32 or 33, since the portion 37 is rotatably and oscillatively carried, as by means of the screw 47, with a portion of the shank thereof extending through the bearing lug 21 and into screw-threaded engagement with the portion 37, where the latter embraces or extends partly around (but is slightly spaced from) the lug. The opposite end portion 35 is not pivoted nor otherwise connected in any way with the support portion 10. It will be noted in Fig. 5, that the screw 47 forms a partial universal joint with the portion 37, since the shank, where it extends through the lug 21, is substantially ovoidal, and the opening in the lug ample. Thus, the integral portions 35, 36 and 37 which, as a whole, may be termed the carrying member 48, may be partly raised and then swung as described. When the member 48 is swung to one position, as the full line position in Fig. 2, the cam follower 46 will contact the cam face 33 in position to ride therealong and, when swung to the dotted line position in Fig. 6, the follower will be in position to contact the cam face 32 to ride therealong. It is preferred that the set screw, forming the cam follower have suitable calibrated indicia 48' to enable the operator to adjust the position of the cam follower toward or away from the cam faces 32 and 33 respectively. Obviously, the farther the cam follower projects toward either cam face, the greater will be the throw of the member 48 to one side or the other of the longitudinal axis of the support portion 10. It will be noted that the indicia 48' is spaced substantially 90° apart and represents standard numbers of saw teeth to an inch. The thread of the screw may be upset at either end whereby the screw may make one complete revolution only and the indicium at any time rearwardly represents the position of the cam follower with respect to the adjacent cam face.

Oscillations of the member 48 are dampened by means of the free end of the plunger 42 contacting one or the other of the opposite faces of the lugs 23 and, consequently, being pressed inwardly, contracting the spring 43.

The lugs 23 additionally support, upon their upper faces, a keeper 49 which may be pivotally carried by one lug, as by means of a screw 50 with its shank extending through one end and into the adjacent lug. The keeper 49 bridges the space between the lugs, being hooked about the protruding shank of a screw 51 projecting upwardly from the other lug, since the free end of the keeper has a hook 52 for the purpose. A fingerhold 53 may project upwardly from the keeper, to assist in swinging the latter. As may be seen in Fig. 5, when the keeper 49 is in place, its lower face contacts the upper face of the portion 36 and prevents the member 48 from accidentally rising whereby correct actuation of the pawl F would be prevented.

As shown particularly in Figs. 5 and 6, the pawl F comprises a body portion 55 and shank portion 56 with the body portion, as in Fig. 3, having a pair of spaced apart teeth 57 adapted to fit between the teeth of a saw, as in Fig. 3, with the shank portion 56 spaced a substantially equal distance from each tooth and adapted to rotatably extend through the bore 39 and into the bottom of the groove 40 intermediate its ends. A suitable pin 58 extends through the groove and shank portion for both retaining the shank portion against moving longitudinally of the bore 39 and it also limits oscillations of the portions 55 and 56 to substantially 180°.

Actuation of the handle portion 30 not only causes reciprocations of the cam body 31 so that the means E will operate to move the pawl F toward and away from either of the plates 15, but it also provides for reciprocation of the reciprocable portion of the saw setting means G which comprises a reciprocating plunger rod or bar 60 slidable through the plate 14 and bearing 28 and having its rear end face 61 in the path of travel of an enlargement or cam 62 (shown in Fig. 5) upon the handle portion 30 which, when the handle portion 30 is drawn toward the handle portion 11, will force the rod 60 outwardly of the plate 14 and, since the rod 60 preferably has a conventional saw tooth setting configuration or face 63 at its free end, forward movement of the rod 60 will cause the face 63 to contact each alternate saw tooth, one after another, as the pawl F which, of course, operates in synchronism therewith (i. e. the face 63 strikes the saw as the pawl F has reached the limit of its movement toward a plate 15). In order to retract the rod 60 and cause the handle portion 30 to move away from the handle portion 11, into the position shown in Fig. 1, there is provided an expansion helical spring 65 embracing a portion of the reciprocating rod 60 and bearing at one end against the plate 14 and bearing at the other end against an abutment 66 carried by the bar 60. The bar reciprocates through openings in the bearing 28 and plate 14 and may project into the opening 16, as it is reciprocated forwardly, so that it may set the teeth with reference to the anvil 67 which faces the face 63 as is clear in Fig. 6, and is provided with the conventional bevel 68 of varying size characteristic of such anvils. Indicia 69 along the edge of the anvil provide for proper adjustments of the anvil with respect to the face 63. The anvil may be conventionally retained in the opening 16 against the plate 13 by a suitable screw means 70.

Means H to limit retractive movement of the pawl F, by limiting movement in one direction, of the combined cam and movable handle C preferably comprises an adjusting screw having a shank 75 extending through the wall 25 in screw-threaded engagement therewith and having a free end portion disposed in the path of travel of an abutment face 76 of the handle portion 30 preferably substantially opposite the cam 63. The head 77 of the screw may be calibrated as by the indicia 78, substantially like the indicia 48' and, in this case, the indicium representing the number of teeth to the inch of saw blade being set is disposed 90° from either side of a vertical line extending to the axis of rotation of the shank 75 and, whether 90° to the left or 90° to the right, depends upon the left or right position of the pawl F. Threads of the screw shank 75 are upset so that the shank may make but one revolution at 360° in either of the two directions.

There is preferably provided an adjustment means K to cause the teeth-carrying portion 90 of the saw L to contact the anvil 67. This may comprise a set screw with its shank 80 extending through a suitable screw-threaded opening in the bearing 26 and into the opening 16 as in Figs. 1 and 5, the shank 80 extends upwardly at an angle from the vertical and horizontal and is adapted to frictionally contact the teeth-carrying portion 90 but permits sliding movement of one with respect to the other.

Upon insertion of one end of the teeth-carrying portion 90 of a saw, such as the saw L, into the slots 17 and adjusting the set screw of the means K to contact the portion so it is in firm contact with the anvil 67 (the adjustments having previously been made of the member 48 and pawl F depending upon which side of the saw is being set, and of the cam follower 46 and means H), whereupon all the operator need do is press the handle portion 30 as he would a trigger. The pawl F will be reciprocated, moving the saw a distance of two saw teeth and stop, whereupon the rod 60 will move forward and, striking the saw L, will set a tooth, retract and the pawl will also be retracted to engage a tooth spaced two teeth from the last set tooth. Clearly, with the member 48 reversed and the pawl swung upon its pivot, the saw L may be reversed, and the alternate teeth not yet set may be set in the same manner.

Various changes may be made to the form of the invention herein disclosed without departing from the spirit of the invention or scope of the claims.

What is claimed is:

1. A saw set including a support having an upper face and a saw edge portion-receiving opening; a member having a cam-follower-carrying portion and a pawl-carrying end portion; a cam follower carried by the portion; a cam body having a pair of forwardly-converging cam faces, movably carried by the support; means movably supporting the member upon the support with said cam follower in contact with a selected cam face; means to manually move said cam body to cause said cam follower to move along the face it contacts and move said member; a reversible saw tooth-engaging pawl, having a pair of teeth with a selected tooth within and movable along said opening, upon movement of said member, from one position to another position; means carried by said member and pawl to manually pivot said pawl to said pawl-carrying end portion to cause a selected pawl tooth to contact a saw tooth within said opening; and mechanical means to set saw teeth, carried by said support, upon completion of movement of said pawl to one of said positions.

2. A saw set according to claim 1 characterized in that said cam follower-carrying portion is bowed and extends partly around and spaced from said cam.

3. A saw set according to claim 1 characterized in that said cam follower-carrying portion is bowed and extends partly around and spaced from said cam and said member is slidable over said upper face.

4. A saw set according to claim 1 characterized in that said support is elongated, said cam follower-carrying portion is bowed and extends partly around and spaced from said cam, and said member is slidable transversely over said upper face.

5. A saw set according to claim 1 characterized in that said support is elongated and the movement of said member is oscillatory with respect to the longitudinal axis of said support.

6. A saw set according to claim 1 characterized in that the means movably supporting the member upon the support with the cam follower in contact with a selected cam face also allows movements, toward and away from said upper face, of said member at the portion of said member provided with the pivot means for said pawl.

7. A saw set according to claim 1 characterized in that the means movably supporting the member upon the support with the cam follower in contact with a selected cam face also allows movements, toward and away from said upper face, of said member at the portion of said member provided with the pivot means for said pawl, and said saw set also includes means carried by said support to manually selectively prevent and permit said movement.

8. A saw set according to claim 1 characterized in that said means to manually move said cam body includes a handle with said handle movably carried by said support, and said cam body is mounted upon said handle.

9. A saw set according to claim 1 characterized in that said means to manually move said cam body includes a handle with said handle pivotally carried by said support, and said cam body is rigidly mounted upon said handle.

10. A saw set according to claim 1 characterized in that portions of said mechanical means to set saw teeth are within said opening.

11. A saw set according to claim 1 characterized in that said opening has end walls, and means is provided to limit the extent of pivotal movement of said pawl to substantially 180° to cause a selected pawl tooth to enter said opening and face the adjacent end wall thereof.

12. A saw set including an elongated support having a saw edge portion-receiving opening, an upper face and a bearing extending from said face, a member having a joint connection end portion; a cam follower-carrying intermediate portion and a pawl-carrying end portion; joint means connecting said bearing and the first end portion to manually move all of said portions selectively toward and away from said face, to manually pivot said member substantially 180° with its axis substantially parallel with the longitudinal axis of said support, and to mechanically oscillate said member from side to side of said support; a cam follower adjustably carried by said cam follower-carrying portion; a cam body having a pair of cam faces, movably carried by the support to reciprocate longitudinally thereof with said cam follower in contact with a selected cam face; means to reciprocate said cam body to cause said cam follower to move along the selected cam face and oscillate said member; a reversible saw tooth-engaging pawl, having a pair of teeth, with a selected tooth within and movable along said opening, upon movement of said member, from one position to another position; means carried by said pawl-carrying end portion and pawl to manually pivot said pawl to cause a selected tooth to contact a saw tooth; mechanical means to set saw teeth, carried by said support, upon completion of movement of said pawl to one of said positions; and means to selectively limit movement of said cam in one direction.

13. A saw set according to claim 12 characterized in that said one direction is toward said first-named end portion.

JOHN SCHNEIDER.

REFERENCES CITED

The following references are of record in the file of this patent:

UNITED STATES PATENTS

| Number | Name | Date |
|---|---|---|
| 751,849 | Haltom | Feb. 9, 1904 |
| 1,470,694 | Meed | Oct. 16, 1923 |
| 1,794,695 | Juhl | Mar. 3, 1931 |
| 2,425,876 | Hively | Aug. 19, 1947 |
| 2,498,167 | Lorenz | Feb. 21, 1950 |